Sept. 1, 1953   N. H. KLAGES   2,650,430
GLASS CUTTING MACHINE

Filed Feb. 9, 1950   11 Sheets-Sheet 2

INVENTOR.
Norman H. Klages
BY
*Webb, Mackey & Burden*
HIS ATTORNEYS

Sept. 1, 1953 N. H. KLAGES 2,650,430
GLASS CUTTING MACHINE
Filed Feb. 9, 1950 11 Sheets-Sheet 5

INVENTOR.
Norman H. Klages
BY
HIS ATTORNEYS

Sept. 1, 1953  N. H. KLAGES  2,650,430
GLASS CUTTING MACHINE
Filed Feb. 9, 1950  11 Sheets-Sheet 6

INVENTOR.
Norman H. Klages
BY
Webb, Mackey & Burden
HIS ATTORNEYS

Sept. 1, 1953 N. H. KLAGES 2,650,430
GLASS CUTTING MACHINE
Filed Feb. 9, 1950 11 Sheets-Sheet 7

INVENTOR.
*Norman H. Klages*
BY
*Webb, Mackey & Burden*
HIS ATTORNEYS

Sept. 1, 1953  N. H. KLAGES  2,650,430
GLASS CUTTING MACHINE
Filed Feb. 9, 1950  11 Sheets-Sheet 8

INVENTOR.
Norman H. Klages
BY
HIS ATTORNEYS

Sept. 1, 1953 N. H. KLAGES 2,650,430
GLASS CUTTING MACHINE
Filed Feb. 9, 1950 11 Sheets-Sheet 10

INVENTOR.
Norman H. Klages
BY
*Webb, Mackey & Burdin*
HIS ATTORNEYS

Fig. 27

Patented Sept. 1, 1953

2,650,430

UNITED STATES PATENT OFFICE 2,650,430

GLASS CUTTING MACHINE

Norman H. Klages, Pittsburgh, Pa., assignor to American Window Glass Company, Pittsburgh, Pa., a corporation of Pennsylvania Application February 9, 1950, Serial No. 143,281

10 Claims. (Cl. 33—32)

This invention relates to a glass cutting machine for automatically making an accurate transverse cut on a vertically moving sheet of glass so that the cut extends at right angles to the direction of movement of the glass sheet. My machine is of the general type in which there is a cage adapted for vertical movement alongside the rising sheet of glass. The cage carries a cutter carriage which moves transversely across the glass sheet and the cage supports a glass measuring stop which contacts the advancing edge of the sheet. The cage is raised by chains connected to it and passing over sprockets on a cage lift shaft located adjacent the top of the machine. The cage lift shaft is driven from the conveyer rolls which move the glass sheet upwardly, the cage lift shaft being driven from the conveyer rolls by means including a clutch so that the cage lift shaft can be engaged and disengaged from the conveyer rolls.

In glass cutting machines of this general type it is necessary that the cage which carries the transversely movable cutter move at the same speed as the rising glass sheet in order that an accurate cut can be made at right angles to the direction of movement of the sheet. Heretofore it has been proposed to mount a glass measuring stop on the cage by a rigid connection between the glass stop and the cage so that the glass stop engages the advancing edge of the glass sheet and causes the cage to rise at the same speed as the sheet. Such arrangement has the disadvantage that the effort required to rapidly start the vertical movement of the unbalanced weight of the cage (counterweights generally being employed for balancing a part of the weight of the cage) is taken by the glass sheet, which sometimes breaks because of the strain imposed on it.

Even if the advancing edge of the glass sheet is used merely to throw a switch which engages a clutch on the cage lift shaft so that the cage is driven from the conveyer rolls, certain disadvantages follow. With such arrangement it is practically impossible to cause the cage at the beginning of its rise to have the same speed as the glass sheet because there is always some slippage in the clutch and also variance in slippage of the rolls which move the glass. Accordingly, the advancing edge of the glass sheet has to take a considerable portion of the unbalanced weight of the cage and this may lead to breakage of the sheet.

These disadvantages of prior machines are overcome or minimized according to my invention. I mount the glass stop on a measuring tube connected to a stud mounted on the cage, the connection between the measuring tube and the stud allowing limited relative movement between these parts, a suitable connection being a pin or rod carried by the measuring tube and extending through a slot in the stud. With such an arrangement the advancing edge of the glass sheet operates a switch which engages a clutch to connect the cage lift shaft with the glass sheet conveyer rolls. Because of the slotted connection which allows limited relative movement between the glass stop and the cage, and the action of the clutch, the cage can be caused to start to rise at a slower rate than the glass sheet and still the glass sheet does not bear the unbalanced weight of the cage, thereby avoiding breakage of the glass sheet. After the cage has begun to rise and when it is desired to make a cut across the sheet, the unbalanced weight of the cage is caused to be taken by the glass sheet so as to insure that the cage and the sheet rise at the same rate in order to make an accurate cut across the sheet. Thus according to my invention, during the first part of the rise of the cage the cage is driven from the glass sheet conveyer rolls so that the extra lift required to rapidly accelerate the speed of the cage is not taken by the glass sheet, but thereafter when the sheet is about to be cut the weight of the cage is taken by the sheet so as to insure an accurate cut.

In the accompanying drawings which illustrate a preferred embodiment of my invention.

Referring more particularly to the accompanying drawings, reference numeral 2 designates a glass sheet which is moved upwardly in a vertical direction by the conveying rolls 3 of a Fourcault machine and which is to be cut or scored transversely of the direction of movement of the glass sheet. A cage indicated generally by the reference numeral 4 is adapted to move vertically, being guided between side rails 5. This cage comprises two end brackets 6 having rollers 7 which roll in slots provided by the side frames 5. The cage 4 has an upper tubular member 8 and a lower tubular member 9 extending transversely of the machine and supported at their ends in the brackets 6. The cage 4 also has a rail 10 which extends transversely of the machine and is supported at its ends in the brackets 6. This rail 10 supports a cutter carriage indicated generally by the reference numeral 12 which moves transversely of the sheet 2 as the cage moves upwardly.

Figure 1:
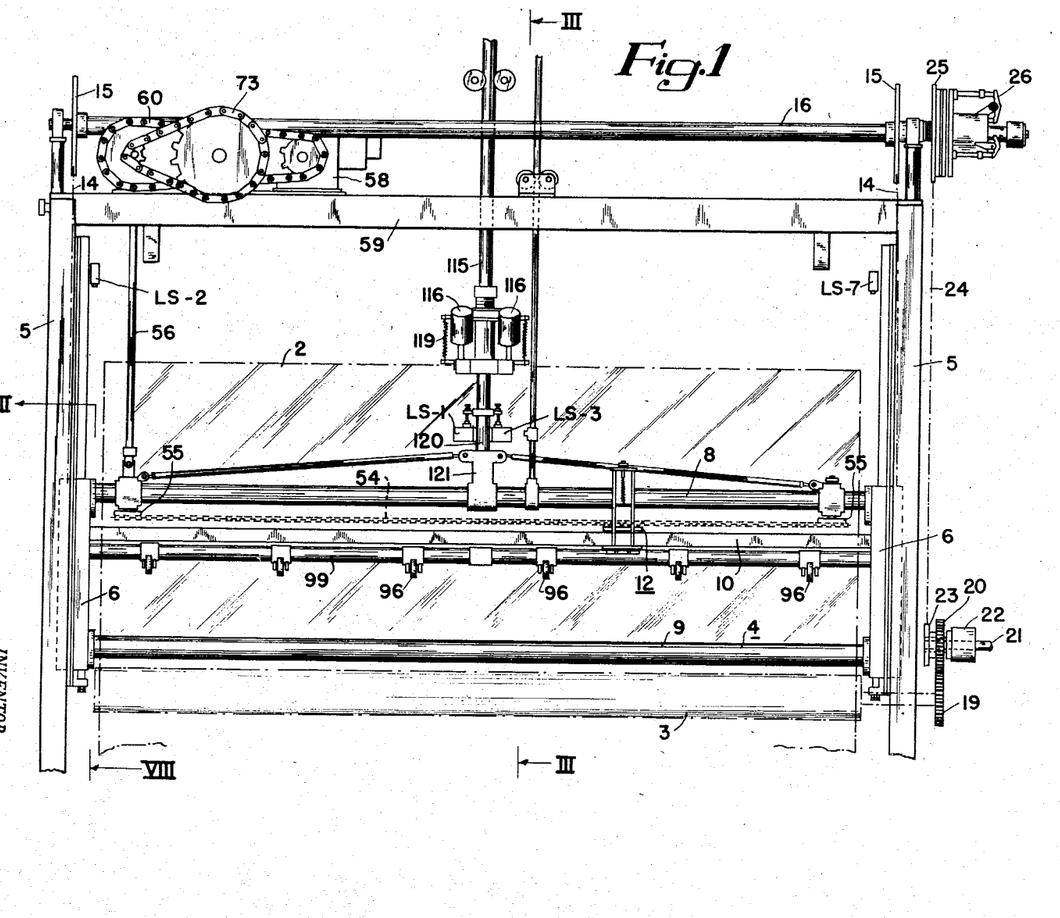
Figure 1 is a front elevation of my glass cutting machine.
Figure 2:
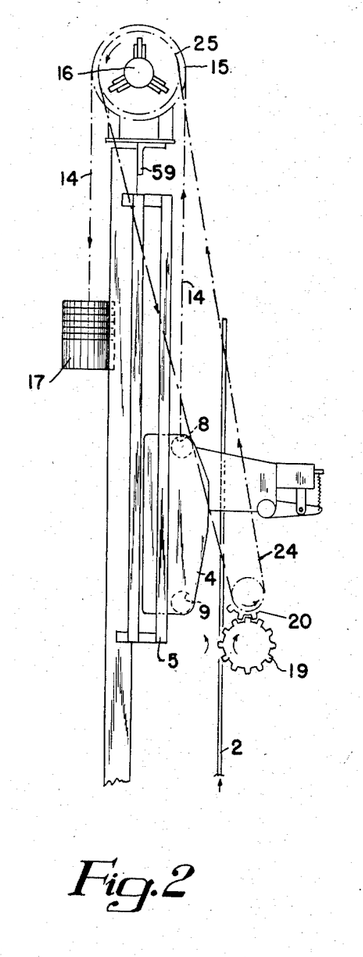
Figure 2 is an end elevation, the showing being somewhat diagrammatic.
Figure 3:
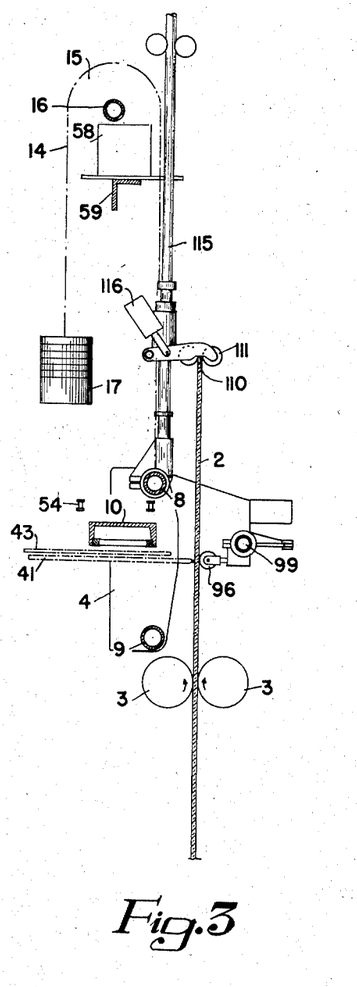
Figure 3 is a diagrammatic vertical section taken in a plane corresponding to the line III—III of Figure 1.
Figure 4:
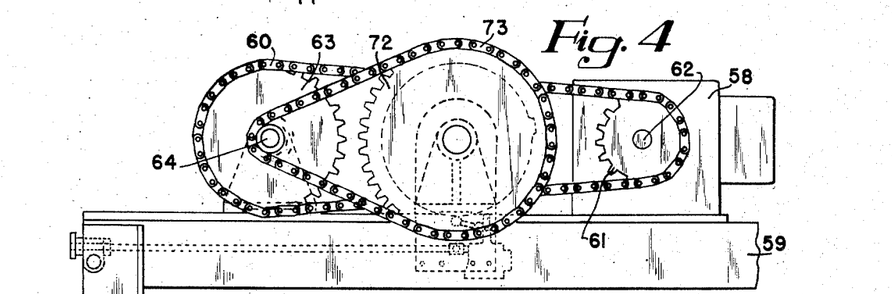
Figure 4 is a partial front elevation of my machine illustrating the driving mechanism for the cutter carriage and the means for rotating cams which operate certain switches.

As shown in Figures 1 and 2, chains 14 are secured at their lower ends to the brackets 6 forming part of the cage 4. Each of these chains 14 passes around a sprocket 15 secured to a cage lift shaft 16 which extends transversely of the machine and is located adjacent the top of the machine. The other end of each of the chains 14 carries a counterweight 17 which substantially balances the weight of the cage 4. It will be seen that as the shaft 16 is rotated in the proper direction, the sprockets 15 rotate and since the chains 14 pass around these sprockets the cage 4 is raised.

The shaft 16 is rotated in order to raise the cage 4 in the following manner. One of the roll shafts 3 of the Fourcault machine is extended. These roll shafts are driven by the main drive motor of the Fourcault machine. Mounted on this extended shaft is a spur gear 19 which drives a spur gear 20 on a countershaft 21 on which is mounted an overrunning clutch 22. A sprocket 23 on the overrunning clutch 22 is connected by a chain 24 to a sprocket 25 which is mounted on shaft 16 and which normally idles around this shaft but which can be connected to the shaft by an air operated clutch designated generally by the reference numeral 26 so that when the clutch is engaged the shaft 16 is rotated, thereby rotating the sprockets 15 which are fixed to the shaft and through the chains 14 lifting the cage 4. The mechanical ratio from the roll 3 to the cage lift shaft 16 is such that the cage 4 travels at a slightly slower rate than the periphery of the glass conveying rolls 3. The overrunning clutch 22 makes it possible, however, for the cage 4 to be lifted faster than it would be by the mechanical drive even though the air clutch 26 is engaged as is explained hereinafter more in detail in connection with the operation of the machine when the travel of the glass sheet is used for raising the cage.

Figure 19:
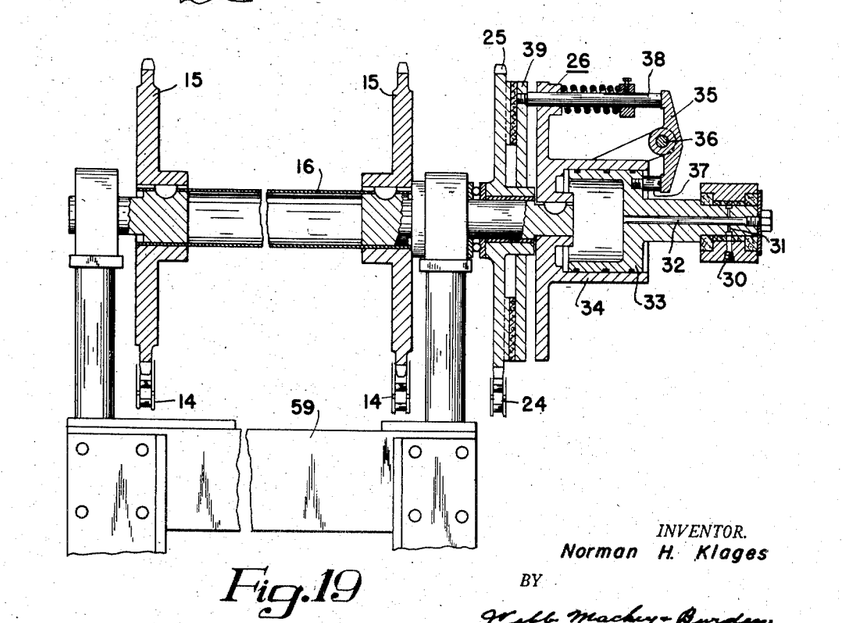
Figure 19 is a broken vertical section through the top part of my machine and illustrating an air operated clutch used in raising the cage.
Figure 20:
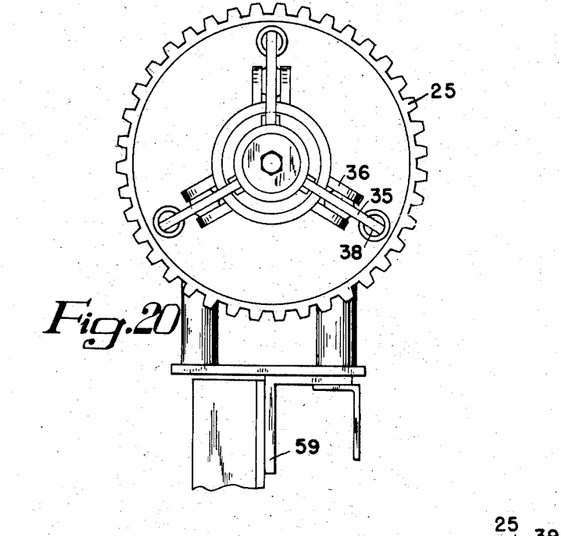
Figure 20 is an end view of the apparatus shown in Figure 19.

The clutch 26 is engaged in the following manner in order to connect the sprocket 25 to the shaft 16. Air admitted through an inlet 30 passes through passages 31 and 32 into the interior of a piston 33 working within a cylinder 34, thereby moving the piston to the right as viewed in Figure 19. Three operating levers 35 pivoted at 36 are contacted at one end by a plug 37 secured to the piston and at their other end contact pressure rods 38. The pressure rods force a pressure plate 39 which is keyed to the shaft 16 into engagement with the sprocket 25, thereby connecting the sprocket with the shaft 16. This clutch can be of any suitable construction.

Figures 10, 11, 12:
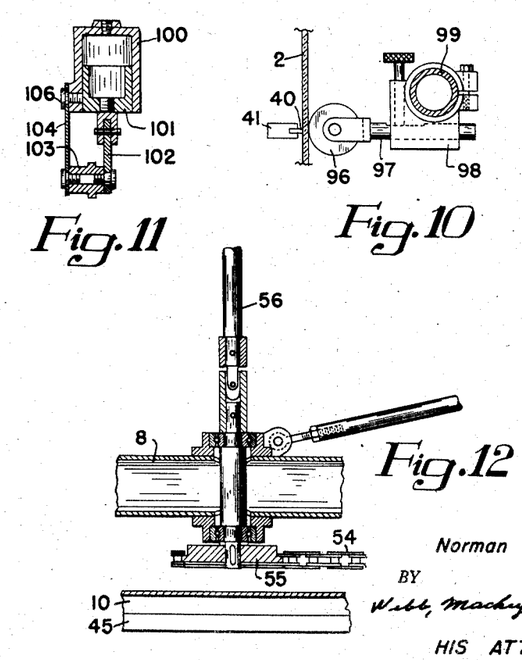
Figure 10 is an end elevation taken on the line X—X of Figure 9.
Figure 11 is a vertical section taken on the line XI—XI of Figure 9.
Fig. 12 is a vertical section taken on the line XII—XII of Figure 9.
Figure 13:
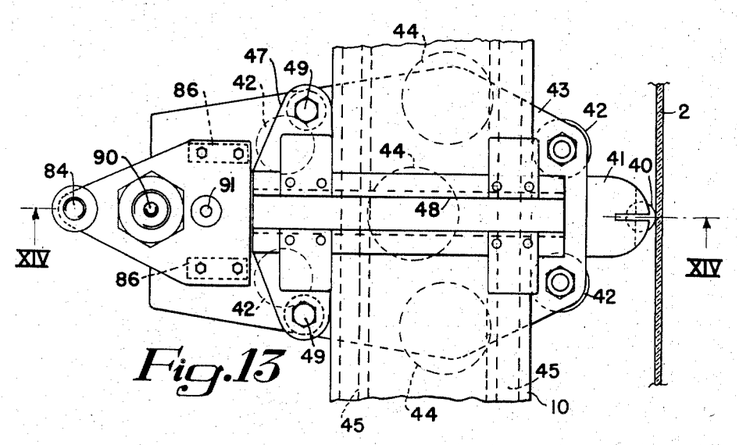
Figure 13 is a plan view of the cutter and cutter carriage and means for operating the cutter.
Figures 14, 15:
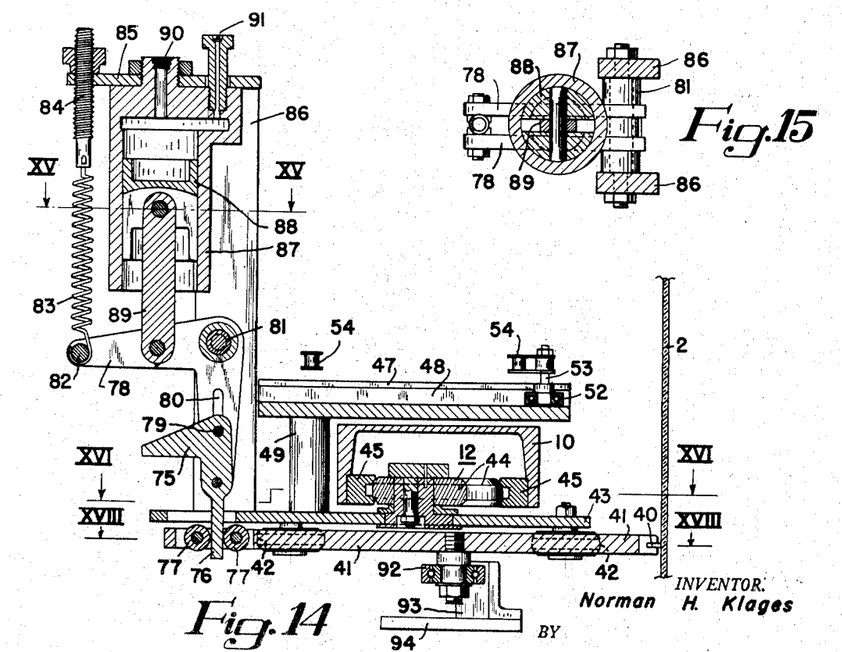
Figure 14 is a vertical section taken on the line XIV—XIV of Figure 13.
Figure 15 is a horizontal section taken on the line XV—XV of Figure 14.
Figure 16:
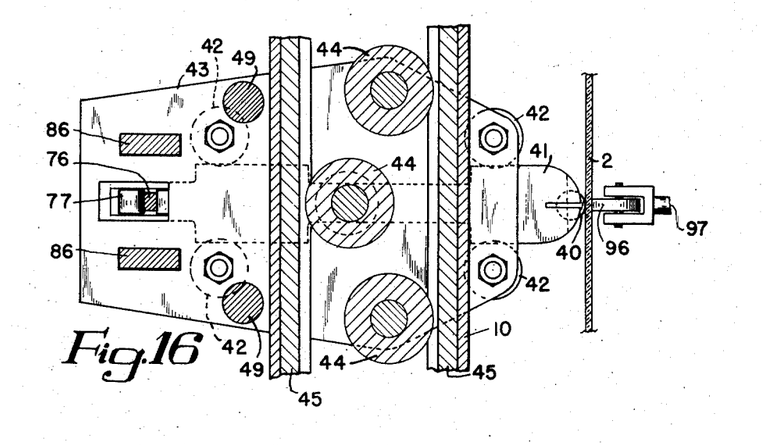
Figure 16 is a horizontal section taken on the line XVI—XVI of Figure 14.
Figure 17:
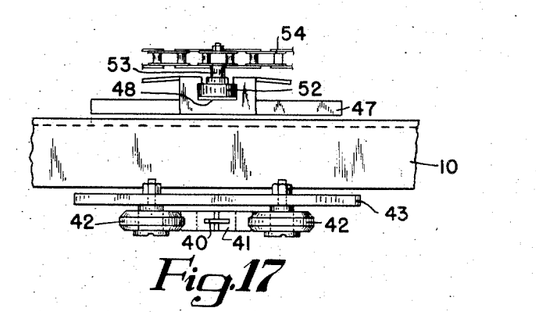
Figure 17 is a front elevation of the cutter and cutter carriage.
Figure 18:
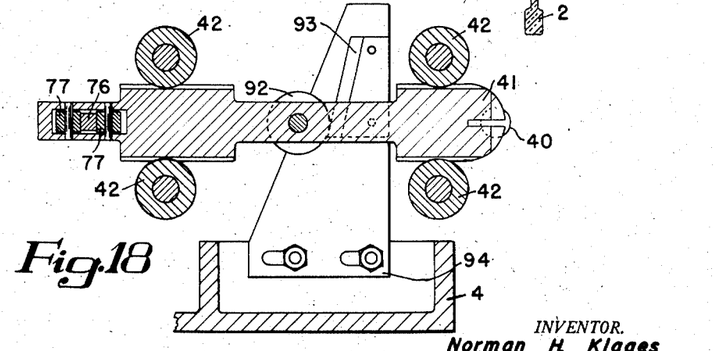
Figure 18 is a horizontal section taken on the line XVIII—XVIII of Figure 14.

The construction and operation of the cutter carriage 12 and cutter is illustrated more particularly in Figures 13–18. A cutter wheel 40 is supported in a cutter holder 41. The cutter holder has sliding movement toward and away from the sheet 2, being guided in this movement by four rollers 42 secured to a plate 43. This plate 43 has three rollers 44 mounted on it which engage tracks 45 secured to the rail 10. A carriage traverse plate 47 having a slot 48 is located above the rail 10 and is secured to two posts 49 which are mounted on the plate 43 which supports the cutter holder 41. Thus movement of the carriage traverse plate 47 moves the cutter carriage 12 transversely across the glass sheet 2. A roller 52 fits in the slot 48, this roller being mounted on a pin 53 carried by the chain 54. The chain 54 passes around two sprockets 55, see Figures 1 and 12, one of which is driven by a drive shaft 56. The chain 54 moves only in one direction but due to the slotted connection between the slot 48 of the traverse plate 47 and the roller 52 the cutter carriage 12 is caused to move from right to left across the sheet 2 and then from left to right across the sheet, the roller 52 sliding in the slot 48 as the chain 54 passes around the sprockets 55.

One of the carriage drive sprockets 55 is driven by a motor 58 mounted on a platform 59 located adjacent the top of the machine. A chain 60 passes around a sprocket 61 secured to motor shaft 62 and around a sprocket 63 secured to a shaft 64. The shaft 64 has a bevel gear 65 secured to it which meshes with a bevel gear 66 which is splined to the vertical carriage drive shaft 56.

Figure 5:
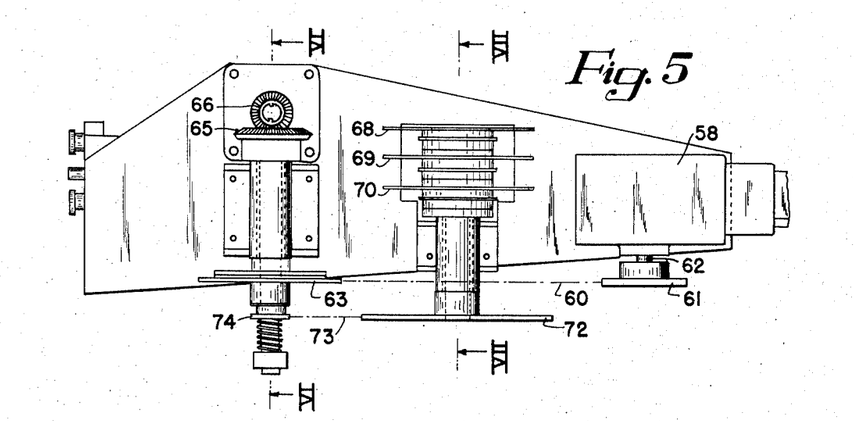
Figure 5 is a plan view of the apparatus shown in Figure 4.
Figure 6:
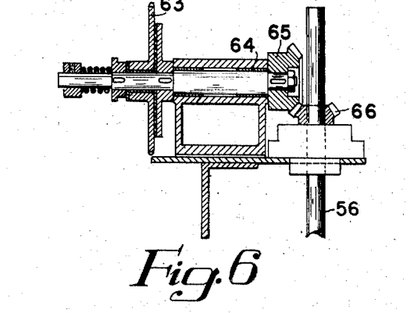
Figure 6 is a vertical section taken on the line VI—VI of Figure 5.
Figure 7:
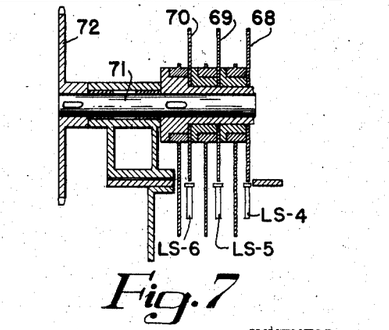
Figure 7 is a vertical section taken on the line VII—VII of Figure 5.

The motor 58, in addition to driving the cutter carriage 12, also rotates a series of cams which are used for controlling certain operations as hereinafter described. These cams are designated by the reference numerals 68, 69 and 70, see Figures 5 and 7, and are connected to a cam shaft 71 having a sprocket 72 secured to it. The sprocket 72 is driven by a chain 73 connected to a sprocket 74 secured to the shaft 64.

Referring again to Figures 13–18, movement of the cutter holder 41 toward and away from the glass sheet 2 is controlled by a cutter lever 75 having its lower end 76 extending between two rollers 77 mounted at the rear of the cutter holder 41. The cutter lever 75 fits between and is slidably connected to two operating levers 78 by pins 79 fitting in a slot 80 so that if desired the cutter lever 75 can be raised by hand to inoperative position. The operating levers 78 are pivoted intermediate their ends at 81 and at their outer ends are provided with a pin 82 to which a spring 83 is secured. The upper end of the spring is fastened to a screw 84 carried by a plate 85 mounted on two posts 86. A cylinder 87 is carried by the plate 85 and has a piston 88. A connecting rod 89 is pivoted to the piston and to the operating levers 78. When air is supplied to the cylinder 87 through inlet 90 the operating lever 78 rotates counterclockwise about its pivot 81 and the cutter lever 75 moves the cutting tool holder 41 and cutting tool 40 toward the glass sheet 2. When air is exhausted from the cylinder 87 through outlet 91 the spring 83 withdraws the cutting tool from the glass sheet. In order to prevent the cutting wheel from striking the glass sheet too hard when air is admitted into the cylinder 87, the cutter holder 41 carries a wheel 92 which cooperates with a wedge shaped cam 93 located adjacent the right hand side of the machine where the cutting tool is applied to the glass sheet. The cam 93 is secured to a part 94 of the cage 4.

Figure 8:
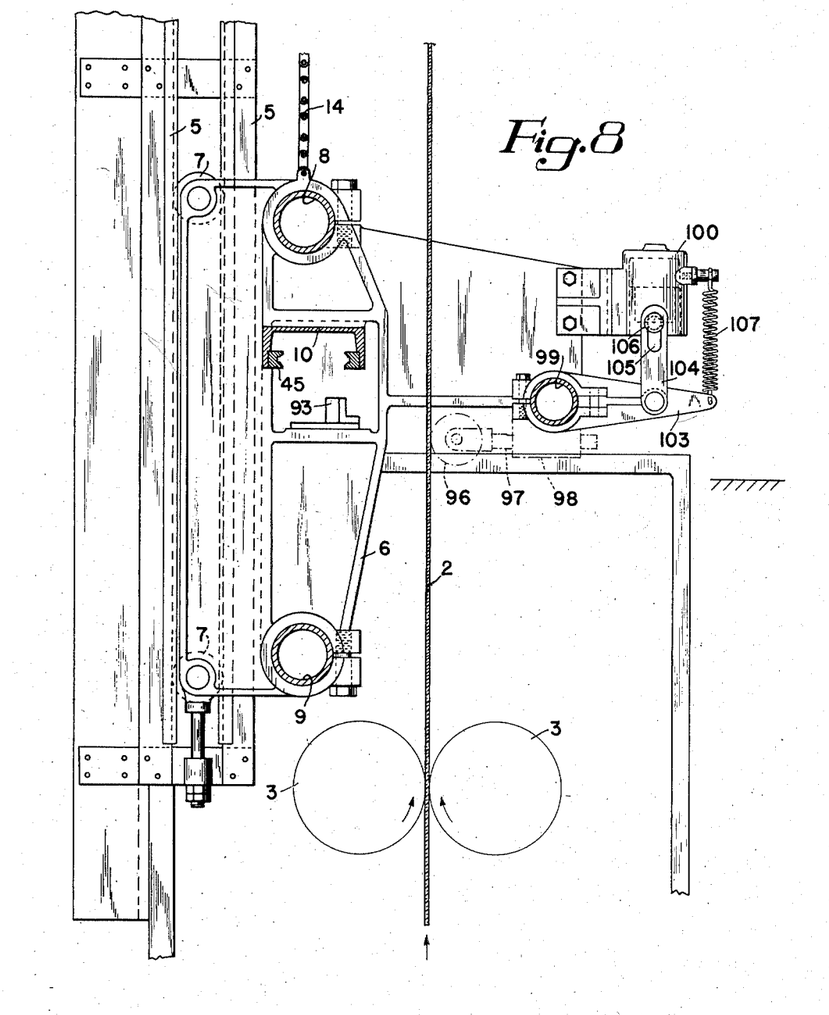
Figure 8 is a vertical section on an enlarged scale taken on the line VIII—VIII of Figure 1.
Figure 9:
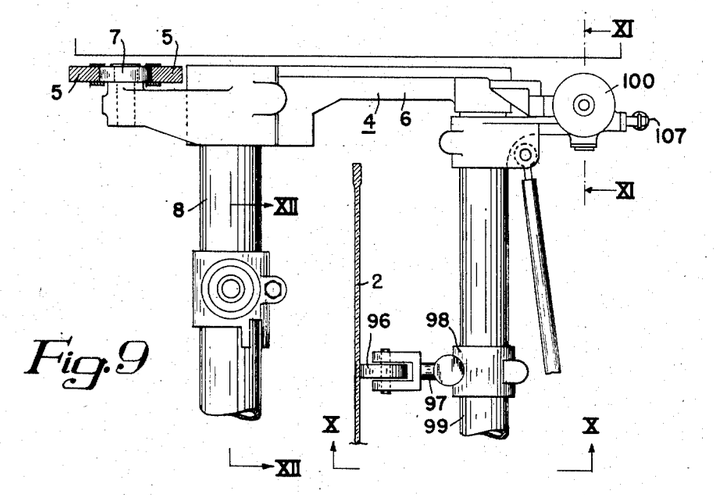
Figure 9 is a plan view of one end of the machine.

During the cutting of the glass sheet 2 the sheet is backed up by back-up rollers which engage the sheet on the opposite surface from the side which is scored. The back-up rollers are designated by the reference numeral 96 and the means for operating them is shown particularly in Figures 1 and 8–11. In Figure 1, six back-up rollers 96 are shown. Each of these rollers is supported by a forked holder 97 mounted in a bracket 98 secured to a tube 99 which is rotatably mounted at its ends in the brackets 6 forming part of the movable cage 4. A cylinder 100 having a piston 101 is mounted on each of the brackets 6. Each of the pistons is connected by a connecting rod 102 to a bracket 103 which is rigidly secured to the tube 99. A limit link 104 having a slot 105 receiving a pin 106 secured to the cylinder limits movement of the bracket 103. When air is admitted to the cylinder 100 the piston 101 and the connecting rod 102 rotate the bracket 103 clockwise as viewed in Figure 8, thereby causing the roller supports 97 to rotate clockwise so as to bring the back-up rollers 96 into engagement with the glass sheet. When air is exhausted from the cylinder 100 a spring 107 withdraws the rollers from the glass sheet.

The construction of the glass measuring stop, measuring tube and associated parts which determine the length of glass sheet which is cut, are shown particularly in Figures 1 and 22–26. The advancing edge of the glass sheet 2 contacts a glass stop 110 which extends between guide rolls 111 supported on two levers 112 which are pivoted at 113 to a clamp 114 which is clamped to a measuring tube 115. The glass stop 110 is normally held in its operative position shown in Figure 25 so that it can be engaged by the rising sheet of glass by two air cylinders 116 having pistons 117 and connecting rods 118 pivotally connected to the levers 112. When it is desired to move the glass stop out of the way after the cut has been made and it is desired to break the glass, the air is exhausted from the cylinders 116 and the springs 119 which are connected to the cylinders and to the levers 112 rotate the levers counterclockwise as viewed in Figure 21 to the position shown in Figure 24.

The lower end of the measuring tube 115 receives the upper end of a stud 120 which is mounted in a support 121 secured to the tube 8 which forms a part of the movable cage 4. A spring 122 is located within the measuring tube 115 and is interposed between the top 123 of the stud 120 and a plug 124 secured in the measuring tube. Thus a large part of the weight of the measuring tube and the glass stop mechanism carried by the measuring tube is counterbalanced by the spring 122 so that it requires only a small amount of lifting force applied by the advancing edge of the glass sheet to raise the measuring tube 115 relative to the stud 120.

Two limit switches LS–1 and LS–3 connected by a plate 127 are mounted on the stud 120. The control knob of the limit switch LS–1 is designated 128 and the control knob of the limit switch LS–3 is designated 129. A collar 130 is secured to the measuring tube 115. A limit switch operating rod 131 passes through holes in the collar and holes in the measuring tube and through a slot 134 in the stud 120. The outer ends of the operating rod 131 have operating screws 135 and 136 passing through them and contacting at their lower ends with the buttons 128 and 129 of the limit switches. It will be understood that when the advancing edge of the glass sheet 2 strikes the glass stop 110 the measuring tube 115 rises and carries with it the operating rod 131 which slides in the slot 134 in the stud 120 without raising the stud 120 until such time as the operating rod 131 contacts the upper edge of the slot 134. Thereafter, further lifting of the measuring tube 115 would cause lifting of the stud 120.

My machine comprises various switches for controlling the different operations. The operation and functions of these switches will be described briefly and thereafter a more detailed description of the sequential operation of the machine will be given.

Figure 27:
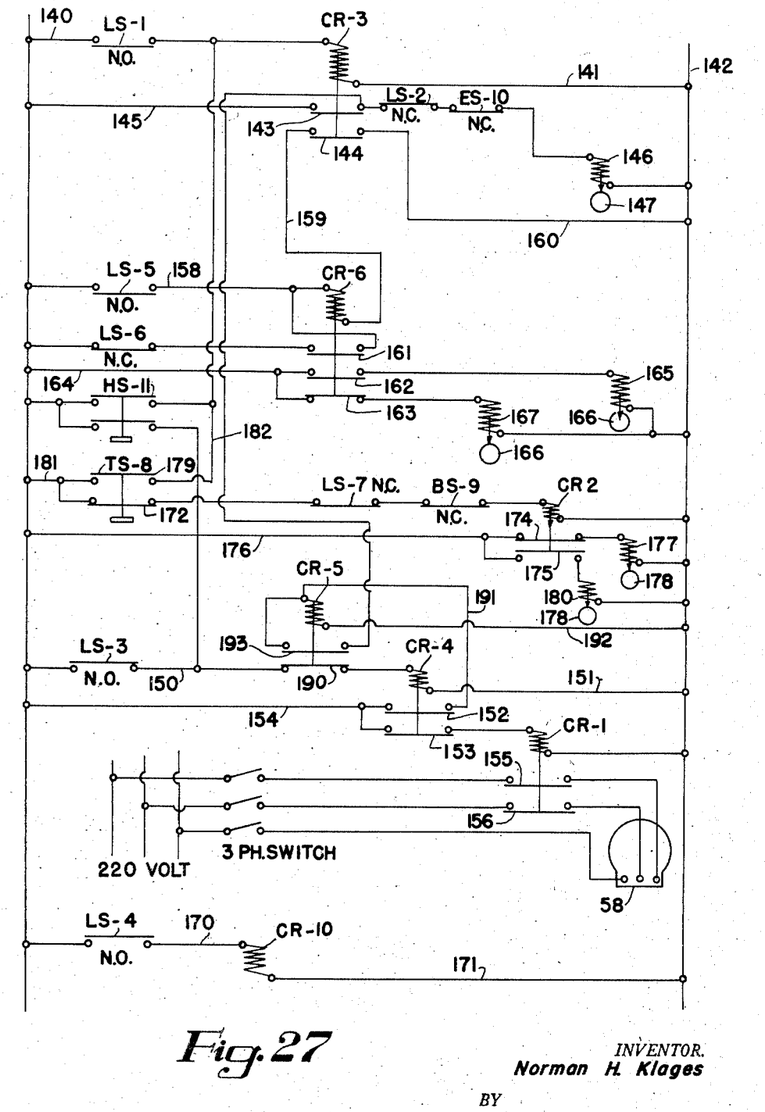
Figure 27 is a wiring diagram.

*Limit switch LS–1.*—This limit switch is mounted on stud 120 supported by the cage 4 and carrying the measuring tube 115. It is so adjusted that it operates as soon as the measuring tube 115 begins to lift or move vertically on its supporting stud 120. Limit switch LS–1 operates the relay CR–3 (see Figure 27) which controls the air clutch 26. In Figure 27, "N. C." means "normally closed" and "N. O." means "normally open."

*Limit switch LS–2.*—This limit switch is mounted on the side frame of the Fourcault machine and prevents injury to the cutting device by preventing the air clutch 26 from carrying the cage 4 too high.

*Limit switch LS-3.*—This limit switch also is mounted on the supporting stud 120 which carries the measuring tube 115. It is so adjusted that it operates as the measuring tube reaches the limit of its vertical travel on the stud 120. This vertical movement is limited by the operating rod 131 and slot 134 connection between the measuring tube and stud. The function of limit switch LS-3 is to start the cutter motor 58.

*Limit switch LS-4.*—This limit switch is operated by the cam 68. Its function is to shut off the cutting motor 58.

*Limit switch LS-5.*—This limit switch is operated by the cam 69. Its function is to admit air to the cutting wheel cylinder 87 so as to move the cutter 40 into engagement with the glass sheet and to admit air to the back-up roller cylinders 100 so as to cause the back-up rollers 96 to engage the glass sheet.

*Limit switch LS-6.*—This limit switch is operated by cam 70. Its function is to exhaust the air from the cutting wheel pressure cylinder 87 and to exhaust air from the back-up roller cylinders 100.

*Limit switch LS-7.*—This limit switch is mounted on the side of the Fourcault machine. Its function is to prevent injury to the cutting device by withdrawing the glass stop 100 when the cage 4 reaches the top of its travel.

Figures 22, 24:
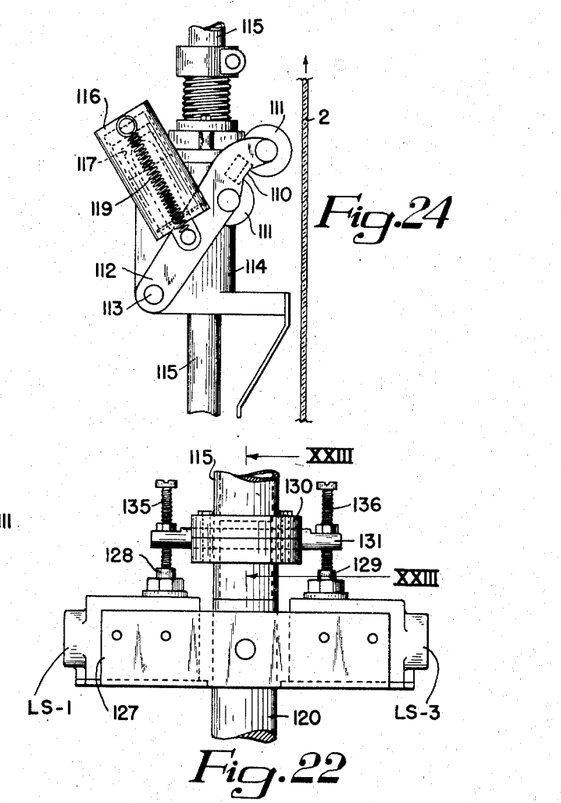
Figure 22 is a front elevation of two limit switches and the means for operating the same.
Figure 24 is a side elevation of the glass stop after it has been withdrawn from engagement with the glass sheet in order to break the sheet along the cut.
Figure 23:
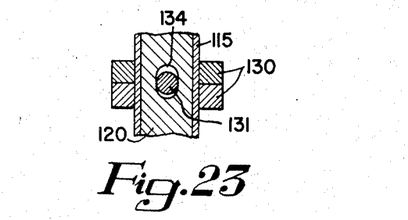
Figure 23 is a vertical section taken on the line XXIII—XXIII of Figure 22.

*Treadle switch TS-8.*—The function of this treadle switch is to withdraw the glass stop 110 from engagement with the glass sheet to the position shown in Figure 24 and to keep the clutch 26 engaged so that the cage 4 continues to rise with the sheet when the breaker snaps the sheet after it has been cut. This retains the back-up rollers 96 in the proper position with relation to the cut in order to make a satisfactory break.

*Bait switch BS-9.*—This switch is used to hold the glass stop 110 in the withdrawn position so that it does not interfere with baiting or interfere with the sheet when it is rising in a broken condition due to an accident.

*Emergency switch ES-10.*—This switch prevents the clutch 26 from engaging. This switch is merely an extra precaution against damage to the machine in case of a failure of limit switch LS-1.

*Handcut switch HS-11.*—The function of this switch is to draw a cut at any time regardless of whether or not the glass has come up high enough to strike the measuring stop 110. It operates to engage the clutch 26 so that the cage 4 rises approximately in time with the glass sheet 2. It also starts the cutting motor 58 in order to make a cut.

The following sequence of operations is carried out in the normal cutting or capping of the glass sheet.

The glass sheet 2 rises vertically until the advancing edge strikes the glass measuring stop 110. The glass starts to lift the unbalanced weight of the measuring tube 115 and the stop mechanism carried thereby. At this stage the measuring tube is actually lifting on its stud 120, the stud and the cage 4 not having yet started to move. This limited movement of the measuring tube 115 relative to the stud 120 is made possible because of the slot 134 in the stud. Thus at this stage the only weight which the glass sheet has to raise is that portion of the weight of the measuring tube 115 and the stop mechanism carried thereby which is not balanced by the spring 122. Accordingly no substantial amount of strain is exerted on the glass sheet 2. As the measuring tube 115 starts to lift relative to the stud 120, limit switch LS-1 closes. This energizes the relay CR-3 for the clutch 26, thereby engaging the clutch. When limit switch LS-1 is closed, current flows from wire 140 through relay CR-3, thereby energizing it, and then through wire 141 to wire 142. Energizing relay CR-3 closes contacts 143 and 144 and current then flows through wire 145, contact 143, limit switch LS-2, emergency switch ES-10 and solenoid 146. Energizing this solenoid opens an air valve 147 which supplies air to inlet 30 of cylinder 34, thereby engaging the clutch 26 as previously described.

The cage 4 begins to rise, being driven by means of the conveyer rolls 3, overrunning clutch 22 and chain 24. The cage is now in vertical motion at a slightly lower speed than the advancing edge of the glass sheet 2. As previously explained, this slightly slower speed of the cage with respect to the advancing edge of the glass sheet is accomplished by using the proper mechanical ratio from the conveyor roll shaft 3 to the cage lift shaft 16. Because the glass sheet 2 is moving faster than the cage 4, the measuring rod 115 continues to travel up with relation to the stud 120 on which it is mounted. Limit switch LS-3 is so set that as the operating rod 131 reaches the top of the slot 134 in the stud, limit switch LS-3 closes. Closing of limit switch LS-3 starts motor 58, causing the cutter carriage 12 to traverse the sheet and also causing the cam shaft 71 to start rotating cams 68, 69 and 70. When limit switch LS-3 is closed, current flows through wire 150, contact 190, relay CR-4, and wire 151, thereby energizing relay CR-4, which closes contacts 152 and 153. Current then flows through wire 154, contact 153 and relay CR-1, thereby closing contacts 155 and 156, which starts the motor 58. Relay CR-4 is a latching type relay. It ties in with a mechanical latch (not shown) which keeps contacts 152 and 153 closed even when relay CR-4 is not energized. Current also flows through wire 154, contact 152, wire 191, relay CR-5 and wire 192, thereby opening contact 190, de-energizing relay CR-4 and closing contact 193. When the measuring rod 115 reaches the limit of its slotted motion on the stud 120, the glass sheet 2 is actually lifting the unbalanced weight of the cage 4. The roll drive 3 and the air clutch 26 are no longer doing any of the lifting work because the glass sheet 2 is raising the cage 4 faster than the mechanical drive tends to raise it. The overrunning clutch 22 permits slippage in the roll drive mechanism so that the cage 4 can rise at exactly the speed of the glass and not at the speed of the mechanical drive.

From the above it will be seen that the cage 4 is started rising by being driven by the conveying rolls 3 through the medium of the chain 24, clutch 26, shaft 16, sprockets 15 and chain 14. Furthermore, that during the starting of the rise of the cage 4, none of the weight of the cage is taken by the rising sheet of glass 2 because the operating rod 131 has not reached the upper end of the slot 134 in the stud 120. However, in order for the cutter 40 to make an accurate cut at right angles to the direction of travel of the glass sheet, the cutter must be moving vertically at the same speed as the glass sheet. This is accomplished in my machine because when the rod 131 reaches the upper end of the slot 134 there is in effect a solid connection between the measuring tube 115 and the stud 120 and thereafter, since the glass sheet is rising at a slightly faster rate than the cage is being caused to rise through its driving connection with the rolls 3, the rising sheet of glass 2 then takes over the work of raising the cage 4 and raises it at exactly the same speed as the rate at which the sheet is rising. Since the cutter carriage 12 is mounted on the cage 4 and since the cage is now rising at the same speed as the glass sheet, an accurate cut at right angles to the direction of movement of the sheet can be made.

The mechanism is so arranged that the cutting carriage 12 stops near the right hand side of the machine as viewed in Figure 1 but not at the extreme right hand end of its travel. When the cutting motor 58 starts, the cutter carriage 12 begins to move from left to right. It reaches the extreme right hand travel and starts back from right to left. At this point cam 69 closes limit switch LS-5. Current then flows through wire 158, relay CR-6, wire 159, contact 144 and wire 160, thus energizing relay CR-6 and closing contacts 161 and 162 and opening contact 163. Current then flows through wire 164, contact 162, through relay 165, which opens a valve 166 so as to supply air to the cylinder 87, thereby forcing the cutter 40 against the glass sheet 2 and also supplying air to the cylinders 100 which move the back-up rollers 96 into engagement with the glass sheet. The tapered or wedge shaped cam 93 functions to lower the cutting wheel without shock against the glass. This prevents the wheel from striking the glass too hard because of the sudden inrush of air into the cutting pressure cylinder 87.

The cutter carriage 12 traverses from right to left and the cut or score is made in the glass. As it reaches the left hand edge of the glass sheet, the cam 70 operates limit switch LS-6. This limit switch opens and drops out relay CR-6, thereby opening contacts 161 and 162 and closing contact 163. Current then flows through wire 164, contact 163 and relay 167 which turns valve 166 to exhaust position, thereby allowing spring 83 to withdraw cutter 40 from engagement with the glass sheet and permitting springs 107 to move the back-up rollers 96 away from the glass sheet. The timing of the cams 69 and 70 which operate limit switches LS-5 and LS-6 can be adjusted easily by the operator so that the length of cut can be controlled.

When the cutting carriage 12 reaches its extreme left hand traverse it continues (with the cutting wheel 40 withdrawn from the glass) and starts its return from left to right. Cam 68 then closes limit switch LS-4. Current then flows through wire 170, coil CL-10 and wire 171, thereby unlatching relay CR-4 (which is a latching type relay), opening contacts 152 and 153 and stopping the cutting and cam shaft drive motor 58. This motor drifts to a stop when the traverse of the cutter carriage 12 is near its extreme right hand travel.

Figure 21:
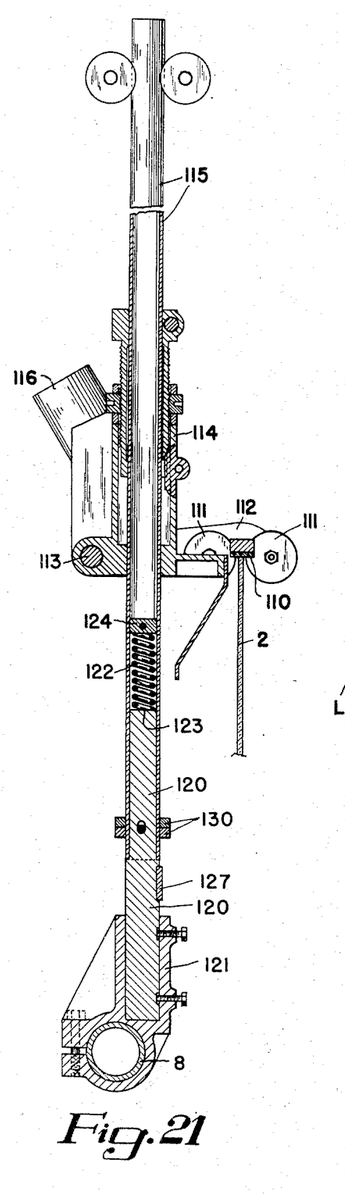
Figure 21 is a vertical section through a stud mounted on the cage and a measuring tube slidable on the stud and carrying a glass stop, which arrangement is used for operating the limit switches shown in Figure 22.
Figure 25:
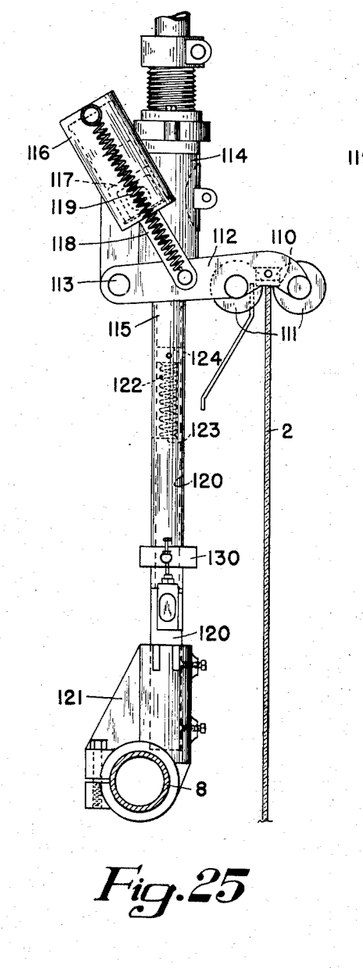
Figure 25 is a side elevation illustrating the glass stop and operating mechanism therefor, the glass stop being in engagement with the advancing edge of a sheet of glass.
Figure 26:
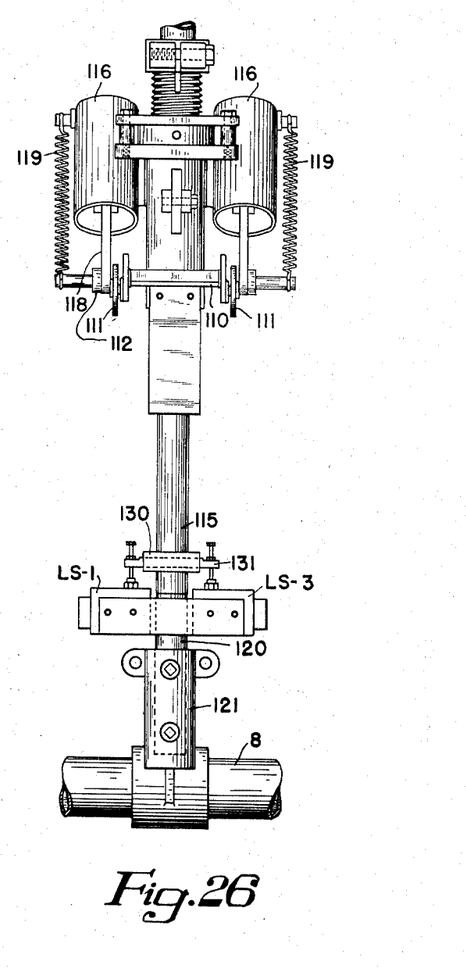
Figure 26 is a front elevation of the apparatus shown in Figure 25, the glass sheet being omitted.

In the operation thus far described the glass stop 110 is in the operative position shown in Figure 21 in position to be engaged by the glass sheet 2, being held in this position by admitting air into the cylinder 116 shown in Figure 25. Air is admitted into the cylinder 116 in the following manner. Current flows through contact 172 of treadle switch TS-8 and energizes relay CR-2, thereby closing contact 174 and opening contact 175. Current then flows through wire 176, contact 174 and through relay 177 which opens valve 178 to admit air into the cylinders 116.

After the cut has been made, the breaker takes hold of the cut sheet of glass and places his foot on the treadle switch TS-8, thereby opening contact 172 and closing contact 179. Opening contact 172 deenergizes relay CR-2, thereby opening contact 174 and closing contact 175. Current then flows through wire 176, contact 175 and relay 180, thereby opening valve 178 to exhaust position and allowing springs 117 to swing the glass stop 110 to the inoperative position shown in Figure 24. As long as the operator holds his foot on the treadle switch TS-8, the contact 179 will remain closed and current will flow through wire 181, contact 179, wire 182, relay CR-3 and wire 141 so that the clutch 26 will remain engaged and the cage 4 will continue to rise in time with the sheet 2. Because the clutch 26 remains engaged, the cage 4 will continue to rise and the back-up rollers 96 carried by the cage will remain in the proper position with relation to the cut on the glass sheet. This position is approximately 2" below the cut or score and ½" away from the surface of the glass.

After the operator has broken off the piece of glass he takes his foot from the treadle switch TS-8. This opens contact 179 and closes contact 172, thereby disengaging clutch 26 and the cage 4 drops down. Closing of the contact 172 causes air to be admitted to the cylinders 116, thereby swinging down the glass stop 110 to the position shown in Figure 21 so as to be able to engage the new advancing edge of the glass sheet.

The operation is then repeated.

The invention is not limited to the preferred embodiment but may be otherwise embodied or practiced within the scope of the following claims.

I claim:

1. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, said stop being supported by and being capable of limited vertical movement relative to said cage, a cage lift shaft, means connecting said cage and said shaft for raising said cage upon rotation of said shaft, driving means including a clutch for driving said cage lift shaft from said conveyor rolls, and means dependent upon movement of said stop relative to said cage for operating said clutch.

2. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, a measuring tube supporting said stop, a stud mounted on said cage and supporting said measuring tube, said measuring tube having limited vertical movement relative to said stud, a cage lift shaft, means connecting said cage and said shaft for raising said cage upon rotation of said shaft, driving means including a clutch for driving said cage lift shaft from said conveyor rolls, and means dependent upon movement of said measuring tube relative to said stud for operating said clutch.

3. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, a measuring tube supporting said stop, a stud mounted on said cage and supporting said measuring tube, a spring interposed between said stud and said measuring tube, said measuring tube having limited vertical movement relative to said stud, a cage lift shaft, means connecting said cage and said shaft for raising said cage upon rotation of said shaft, driving means including a clutch for driving said cage lift shaft from said conveyor rolls, and means dependent upon movement of said measuring tube relative to said stud for operating said clutch.

4. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, a measuring tube supporting said stop, a stud mounted on said cage and supporting said measuring tube, said measuring tube having limited vertical movement relative to said stud, a cage lift shaft, means connecting said cage and said shaft for raising said cage upon rotation of said shaft, driving means including a clutch for driving said cage lift shaft from said conveyor rolls, means normally disengaging said clutch, a limit switch mounted on said stud, a limit switch operating rod carried by said measuring tube and passing through a slot in said stud, said slot allowing limited movement of said measuring tube relative to said stud, and means controlled by said limit switch for engaging said clutch.

5. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, a measuring tube supporting said stop, a stud mounted on said cage and supporting said measuring tube, a cage lift shaft, means connecting said cage and said shaft for raising said cage upon rotation of said shaft, driving means including a clutch for driving said cage lift shaft from said conveyor rolls at such rate that said cage travels slower than the periphery of said conveyor rolls, means normally disengaging said clutch, a limit switch mounted on said stud, a limit switch operating rod carried by said measuring tube and passing through a slot in said stud, said slot allowing limited movement of said measuring tube relative to said stud, and means controlled by said limit switch for engaging said clutch.

6. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, a measuring tube supporting said stop, a stud mounted on said cage and supporting said measuring tube, a cage lift shaft, means connecting said cage and said shaft for raising said cage upon rotation of said shaft, driving means for driving said cage lift shaft from said conveyor rolls at such rate that said cage travels slower than the periphery of said conveyor rolls, said driving means including an idling sprocket mounted on said cage lift shaft, a friction clutch for connecting said idling sprocket to said cage lift shaft, means normally disengaging said friction clutch, a conveyor roll sprocket driven by said conveyor roll, an overrunning clutch interposed between said conveyor roll sprocket and said conveyor roll, a chain connecting said idler sprocket and said conveyor roll sprocket, a limit switch mounted on said stud, a limit switch operating rod carried by said measuring tube and passing through a slot in said stud, said slot allowing limited movement of said measuring tube relative to said stud, and means controlled by said limit switch for engaging said friction clutch.

7. In a machine for making a transverse cut across a vertically rising sheet of glass, conveyor rolls for moving the sheet vertically, a cage guided for vertical movement alongside said sheet, a cutter supported on said cage and movable across said sheet, a cutting motor and operating connections thereto for moving said cutter across said sheet, a glass measuring stop adapted to contact the advancing edge of said sheet, a measuring tube supporting said stop, a stud mounted on said cage and supporting said measuring tube, a cage lift shaft, means connecting said cage and said shaft for raising said cage upon rotation of said shaft, driving means including a clutch for driving said cage lift shaft from said conveyor rolls at such rate that said cage travels slower than the periphery of said conveyor rolls, means normally disengaging said clutch, a first limit switch and a second limit switch both mounted on said stud, a limit switch operating rod carried by said measuring tube and passing through a slot in said stud, said slot allowing limited movement of said measuring tube relative to said stud, two contacts carried by said operating rod for operating said two limit switches respectively, means controlled by said first limit switch for engaging said clutch, and means controlled by said second limit switch for starting said cutting motor.

8. In a machine for making a transverse cut across a vertically rising sheet of glass, said machine including conveyor rolls for moving the sheet vertically, a cage guided for vertical movement alongside of but spaced from the body of said sheet, a cutter supported on said cage and movable across said sheet, back-up rollers supported by said cage and disposed on the opposite side of said sheet from said cutter, a glass measuring stop supported by said cage and means for swinging it from a position in which it contacts the advancing edge of said sheet to a withdrawn position out of contact with said sheet, the improvement which comprises driving means connected to said conveyor rolls for raising said cage, said driving means including a clutch, limit switches supported by said cage and operative when said stop is in engagement with said sheet to cause said cutter to traverse the sheet and to engage said clutch so that said cage is raised by said conveyor rolls, and means for continuing the upward movement of said cage and the back-up rollers carried thereby after said stop has been withdrawn.

9. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, said stop being supported by and being capable of limited vertical movement relative to said cage, driving means connecting the conveyor rolls and cage for starting raising of the cage through force exerted by the conveyor rolls while allowing relative vertical movement between the stop and the cage, and means operative after the cage has begun to rise which prevents relative vertical movement between the stop and the cage, whereby the cage is raised further due to the force of the rising sheet of glass on the stop.

10. In a machine for making a transverse cut across a vertically rising sheet of glass, conveyor rolls for moving the sheet vertically, a cage guided for vertical movement alongside said sheet, a cutter supported on said cage and movable across said sheet, a glass measuring stop adapted to contact the advancing edge of said sheet, said stop being supported by and being capable of limited vertical movement relative to said cage, driving means connecting the conveyor rolls and cage for starting raising of the cage through force exerted by the conveyor rolls and at a slower rate than said rising sheet while allowing relative vertical movement between the stop and the cage, and means operative after the cage has risen at said slower rate which prevents relative vertical movement between the stop and the cage, whereby the cage is raised further due to the force of the rising sheet of glass on the stop and at a rate equal to said rising sheet.

NORMAN H. KLAGES.

References Cited in the file of this patent

UNITED STATES PATENTS

| Number | Name | Date |
|---|---|---|
| 1,988,580 | Tasher | Jan. 22, 1935 |
| 2,111,393 | Gaskell | Mar. 15, 1938 |
| 2,260,103 | Hinkle | Oct. 21, 1941 |
| 2,323,686 | Sommerfeld | July 6, 1943 |